Patented July 24, 1951

2,562,145

UNITED STATES PATENT OFFICE 2,562,145

PREPARATION OF SATURATED SULFUR-CONTAINING HETEROCYCLIC COMPOUNDS

Denham Harman and William E. Vaughan, Berkeley, Calif., assignors to Shell Development Company, San Francisco, Calif., a corporation of Delaware No Drawing. Application July 29, 1947, Serial No. 764,588

7 Claims. (Cl. 260—243)

This invention relates to a method of preparing saturated sulfur-containing heterocyclic compounds. More particularly the invention provides a novel process for the production of saturated cyclic compounds, preferably having ring structures of from five to seven atoms at least one atom of which is sulfur. In its most specific embodiment, the invention provides a novel process adaptable for the commercial production of oxathianes and thiazanes from unsaturated ethers and secondary amines, respectively.

The preparation of saturated heterocyclic compounds has heretofore required the use of relatively difficultly obtainable starting compounds or tedious methods of synthesis. For example, the preparation of the oxathianes generally required the treatment of a 2,2'-dihalo-dialkyl ether in an alcoholic medium with a salt of hydrogen sulfide, and the preparation of compounds such as the thiazanes was best accomplished by first preparing the unsaturated analog and subsequently hydrogenating it to obtain the desired saturated compound. In addition to the expense and time required by such procedures, they often required many variations of reaction procedures and equipment to adapt them to the production of even the next member of the same homologous series.

It is a principal object of the present invention to provide a method of preparing saturated heterocyclic sulfur-containing compounds which is readily adaptable to the production of a wide range of individual compounds. A further object is to provide an inexpensive process for the conversion of diolefinic compounds in a single operational step, to saturated heterocyclic sulfur-containing compounds in which process, substantially all of the diolefinic reactant, which is not converted into the desired product, is converted into a commercially valuable side-reaction product. Still other objects and advantages of the present process will be apparent from the following description.

We have made the surprising discovery that when unsaturated compounds in which two non-conjugated olefinic linkages comprise the carbon-to-carbon unsaturation are combined under superatmospheric pressure with hydrogen sulfide, a heterocyclic sulfur-containing compound is produced in a single operational step. The reaction occurs at a moderately elevated temperature and, depending upon the particular diolefinic compound employed, in the presence of an ionic alkaline catalyst, a source of free radicals, or in the absence of an added catalyst.

In general, any aliphatic compound in which two olefinic linkages are attached to carbon atoms separated by at least one atom joined into the linear chain by two single bonds comprise the carbon-to-carbon unsaturation of the compound may be suitably employed in the process. Even the atoms in the linear chain of the diolefinic starting compounds need not be carbon atoms, and for many particular applications it is preferred that the starting materials contain atoms of elements other than carbon. Suitable starting materials contain atoms of elements other than carbon. Suitable starting materials for the present process therefore include many widely varying individual species of compounds including amines, hydrocarbons, sulfides, ethers, sulfones, metalloorganic compounds, ketones, disulfides, diazo compounds, phosphides, and the like.

Examples of individual diolefinic compounds which may suitably be converted to sulfur-containing heterocyclic compounds include divinyl ether, diallyl ether, dichlorallyl ether, bis(vinylmercapto)methane, diallylamine, dichlorallylamine, vinylmercapto-allylmercaptomethane, diallyl sulfide, dichlorallyl sulfide, N-ethyl N-crotyl allylamine, diallyl disulfide, 1,4-pentadiene, 3,4-dichloro-1,5-hexadiene, diamethallyl disulfide, vinyl allyl ether, diethallyl disulfide, diisopropenyl ether, vinyl isopropenyl ether, N-propyl diallylamine, diisopropenyl sulfide, vinyl methallyl ether, diisopropenyl amine, vinyl crotyl ether, dimethallylamine vinyl allyl sulfide, dimethallyl ether, N-methyl diallylamine, vinyl isopropenyl sulfide, dimethallyl sulfide, vinyl methallylamine, 2,3-dimethyl-1,4-pentadiene, vinyl chlorallylamine, dicrotyl ether, 2,6-heptadiene, dicrotyl sulfide, allyl isopropenyl ether, dicrotylamine, allyl methallyl sulfide, 2,6-dimethyl-1,6-octadiene, allyl crotylamine, vinyl allyl sulfone, dialkyl mercury, vinyl methallyl telluride, diallyl selenide, dimethallyl telluride, vinyl allyl phosphide, and the like.

It has been found that the most desirable yields of cyclic compounds are obtained when the diolefinic starting material, and the catalyst employed are so selected that heterocyclic sulfur-containing compounds having ring structures of from five to seven atoms are produced. It has been further found that the particular atoms of the diolefinic molecule to which the sulfur atom becomes attached to produce a cyclic structure through the formation of a sulfur bridge, are determined by the catalyst employed. In the absence of peroxides and in the presence of ionic or polar catalysts, hydrogen sulfide adds to the double bonds in accordance with Markownikoff's rule for the addition of HX type compounds to such bonds. On the other hand, in the presence of free radicals, hydrogen sulfide adds to the double bonds contrary to Markownikoff's rule, with the sulfur atom becoming attached to the carbon atom bonded to the larger number of hydrogen atoms.

One subclass of suitable diolefinic starting materials comprises aliphatic diolefinic compounds in which the carbon atoms attached to the olefinic linkages are separated in the linear chain by one atom joined in the chain by two single bonds, which are represented by the general formula,

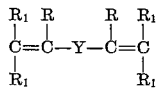

wherein Y represents a polyvalent group a single atom of which is joined in the linear chain by two single bonds, and R and $R_1$ each represent the hydrogen atom or an alkanyl radical with at least one $R_1$ attached to each terminal carbon atom representing the hydrogen atom in every case, and both $R_1$'s representing hydrogen atoms when the adjacent R represents a hydrogen atom. Representative examples of diolefinic starting materials of this subclass include, divinyl ether, divinyl sulfide, divinylamide, divinyl selenide, N-vinyl 1-methylvinylamine, 1-methylpropenyl vinyl sulfide, bis(1-methylpropenyl) ether, bis(1-methylpropenyl) amine, and the like.

A second subclass of suitable diolefinic starting materials comprises aliphatic diolefinic compounds in which the carbon atoms attached to the olefinic linkages are separated in the linear chain by from two to four atoms each joined in the chain by two single bonds, which are represented by the general formula,

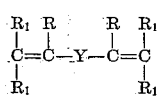

wherein Y represents a polyvalent group, from two to four atoms of which, are joined into the linear chain by two single bonds, and R and $R_1$ each represent the hydrogen atom or an alkanyl radical. Representative examples of this subclass of diolefinic starting materials include, divinyl disulfide, allyl vinyl ether, N-vinyl methallylamine, diallyl disulfide, vinyl allylamine, bis(vinylmercapto) methane, N-propyl diallylamine, 2,6-dimethyl-1,6-octadiene, dichlorallyl ether, allyl crotyl sulfide, N-methyl diallylamine, diallyl telluride, dimethallyl mercury, and the like.

The present process is adaptable for the production of heterocyclic sulfur-containing compounds from any diolefinic material of the general class mentioned above in which the olefinic double bonds are capable of undergoing the normal additive reactions of such bonds. Comparatively high yields of the desired products are more often obtained by the employment of diolefinic starting materials of the subclasses one or two, particularly when the substituent groups represented by R and $R_1$ of the general formulas contain not more than about 6 carbon atoms.

The employment of diolefinic starting materials of subclass two is particularly preferable since, where a catalyst is required, any of the suitable alkaline materials, more fully described below, may be employed in the absence of peroxides, or other sources of free radicals. The employment of members of this subclass, especially the ethers and amines, in which the carbon atoms attached to the olefinic linkages are separated by two atoms each joined in the linear chain by two single bonds, results in high conversions to valuable six-membered heterocyclic sulfur-containing compounds such as, the oxathianes and the thiazanes. In addition, the side reaction products so produced, are lubricating oil additives of a particular commercial value thereby rendering the process an economical method of producing the desired heterocyclic materials. Compounds such as diallylamine, diallyl sulfide, diallyl ether and 1,4-pentadiene are representative of the particularly preferred starting materials which lead to the formation of six-membered heterocyclic compounds.

The present process converts the diolefinic compounds to heterocyclic compounds by the single operational step of heating them in the presence of hydrogen sulfide in the presence of an addition catalyst such as alkaline ionic material, or a source of free radicals. The employment of superatmospheric pressure is required for the formations of a high percentage of the desired heterocyclic compound, but the particular pressure employed is not critical and may suitably vary from slightly above normal atmospheric pressure to any greater pressure which can practically or desirably be obtained. One simple and efficient method of conducting the reaction under sufficient pressure is to employ a closed reaction system capable of withstanding the pressure developed by the reactants when subjected to the desired reaction temperature.

In the absence of free radicals, unless the diolefinic starting material employed is alkaline in nature, as an amine for example, it is necessary to employ a small amount of an ionic alkaline material as a catalyst. Suitable alkaline materials should be substantially unreactive with respect to hydrogen sulfide, at least to the extent that during the course of the reaction there is no substantial formation of sulfides by a reaction between hydrogen sulfide and the catalyst. It has been found that water-soluble inorganic oxygen-containing bases as well as certain nitrogen-containing organic bases may be employed.

Preferable inorganic basic materials are the oxides, amides, or hydroxides of the alkali metals, sodium, potassium and lithium; similar derivatives of the alkaline earth metals, as barium, calcium and magnesium, and the like. However, similar basic oxygen-containing salts of still other metals, such as aluminum which do not form insoluble sulfides, may be employed when the solubility of the particular diolefinic starting compounds are such that sufficient amounts of the inorganic base will remain dissolved in the reaction medium.

In general nitrogen-containing organic bases, including ammonia, such as the arylhydrazines and the primary, secondary or tertiary amines form the preferred catalysts.

Primary alkyl amines in which the alkyl group contains not more than about twelve carbon atoms have been found to be particularly suitable basic catalysts as for example, ammonia or methyl, ethyl, propyl, butyl, pentyl, heptyl, nonyl, and the like amines of which ammonia and n-butylamine have proven especially effective. The primary amine catalysts may contain C-linked substituent alkyl groups, N-linked —$NH_2$ groups, or may be aryl, acyclic or naphthyl amines which may also contain alkyl substituents, as for example, the toluidienes, the ethylanilines, aniline, naphthylamine, cyclohexylamine, the alkylcyclohexylamines, and the like, of which phenylhydrazine is especially suitable.

Suitable secondary amine catalysts may be mixed or symmetrical N,N'-dialkyl, N-aryl alkyl, or N-alkyl cycloalkyl amines of less than about thirteen carbon atoms, and as mentioned previously, may comprise aliphatic diolefinic amines of the general class of suitable amine starting materials when it is desired to prepare nitrogen-containing heterocyclic compounds. Illustrative of suitable secondary-amines are, dimethyl, N-methyl naphthyl, diethyl, diisopropyl, N-methyl phenyl, N-methylcyclohexyl, N-ethyl propyl, N-ethyl phenyl, and the like amines, of which the symmetrical amines containing not more than about 9 carbon atoms are preferred, especially di-n-butylamine.

Tertiary amines which may be employed as the basic material or catalyst are preferably aliphatic tertiary amines containing three symmetrical lower alkyl groups such as, trimethyl, tripropyl, tributyl, and the like amines. In certain cases the quaternary ammonium salts may be similarly employed.

The amount of the basic material or catalyst to be employed may suitably be varied, but in general, the most satisfactory results have been obtained by the employment of from about 1 to about 10 molar percent of basic material based on the total mols of reactants employed, i. e., based upon the total number of mols of diolefinic compound and hydrogen sulfide employed. The particularly preferred molar percent of catalyst is between about 2 and 5 molar percent of the total molar amount of reactants, unless the basic material consists of a diolefinic amine employed as a reactant, in which case the amine is employed in the same amount that would be used in the case of any suitable diolefinic starting material.

When diolefinic starting materials in which the carbon atoms attached to the olefinic linkages are separated by one atom joined in the linear chain by two single bonds, i. e., members of subclass one, are employed the formation of the heterocyclic compound is accomplished in the presence of a source of free radicals. While the present invention is not dependent upon any particular reaction mechanism, it is felt that when a source of free radicals is present to sensitize or initiate the reaction, the addition of hydrogen sulfide proceeds through a free radical chain mechanism in contrast to the "normal" hydrogen sulfide addition which occurs as a molecular addition process. The free radical chain reaction mechanism, or "abnormal addition" is preferred where the diolefinic compounds are of subclass one since it results in the formation of six-membered rings rather than a comparatively more difficultly obtainable four-membered ring.

Decomposing organic peroxides, light having a wave length short enough to allow its adsorption by hydrogen sulfide (2800 A. U. or less), which consequently results in the dissociation of the hydrogen sulfide, or having a longer wave length in the presence of a substance decomposed by longer wave length radiation (as acetone at 3200 A. U.) or still other sources of free radicals such as oxygen, azomethane, tetraethyl lead and the like may be employed as the source of the free radicals.

Dialkyl peroxides comprise a particularly preferred source of free radicals for such reactions, and of the dialkyl peroxides, the di-tertiary-alkyl peroxides are especially suitable as their employment reduces possible accident through violent decomposition of the catalyst during handling. Examples of di-tertiary-alkyl peroxides include di-tertiary-butyl peroxide, di-tertiary-amyl peroxide, di-tertiary-hexyl peroxide and the like.

Other peroxides which are suitable include alkyl peroxy alkanes, such as 2,2-bis(tertiary-butylperoxy)butane, as well as peroxides such as benzoyl peroxide, acetyl peroxide, benzoyl acetyl peroxide, and lauroyl peroxide, and hydroxyalkyl peroxides, such as hydroxy methyl tertiary butyl peroxide.

The peroxide catalysts or reaction initiators may be used in a wide range of concentration, but preferably are employed in amounts of from about 1 mol percent to about 10 mol percent, based on the total mols of reactants present. Optimum results are obtained when the organic peroxide catalyst concentration is from about 2 to about 5 mol percent.

The temperature at which the reaction is conducted will depend to a certain extent on the concentration, activity and stability of the organic peroxide or other source of free radicals employed. If temperatures above about 150° C. are used when an organic peroxide catalyst concentration is as high as 10 mol percent, the reaction may become violent, even to the point of explosion. However, if an active peroxide catalyst is present, even in amounts as low as about one mole percent, the reaction will proceed at a satisfactory rate at temperatures as low as about 40° C. and even lower temperatures may be employed with other sources of free radicals. It is preferable, from an economic and control standpoint, when using about 2½ mol percent of a peroxide sensitizer, to maintain the temperature within the range from about 75° C. to about 150° C. In general, in the cases where the employment of a source of free radicals is not required, as where the diolefinic compound is basic, or an alkaline material is employed, the reaction rates corresponding to the reaction temperatures are about the same. However, where the reactants are high molecular weight or inert materials, temperatures up to the points of substantial decomposition may suitably be employed, particularly under a relatively low reaction pressure.

The time for which the cyclization reaction is allowed to proceed in order to obtain the maximum yield of heterocyclic product will vary with the activity of the catalyst, the temperatures and pressures employed. Usually the reaction will be completed, when the other conditions are as stated hereinbefore, in from about 1 to about 50 or more hours, and close control of the reaction is obtained when conditions are such that the reaction time is from about 20 to 40 hours.

Diluents may or may not be used, as desired. While they are not essential, their use at times may be preferable in order to reduce the viscosity of the reaction mixture, to act as a mutual solvent for the reactants and catalyst, or to reduce the concentration of the reactants, thus allowing close control of the course of the reaction. Preferably, the diluent is substantially inert with respect to the reactants or catalysts. Saturated hydrocarbons are useful for this purpose.

An individual heterocyclic sulfur-containing compound or a mixture of the same may be obtained by employing, respectively, individual or mixed diolefinic starting materials. The molecular ratio of the diolefinic compound to hydrogen sulfide may suitably be varied over a wide range with either the diolefinic compounds or the hydrogen sulfide present in excess. In general, it is most economical and is preferable to employ the reactants in substantially equimolar portions. In any case, the heterocyclic compounds may readily be separated from the resultant mixed reaction products by well-known procedures, such as distillation.

Fractional distillation of the mixed reaction products is a preferred method of isolating heterocyclic sulfur-containing compounds prepared by the present process, since the side-reaction components are generally extremely high boiling liquids, and by fractional distillation the heterocyclic compounds may usually be obtained in the form of colorless, substantially pure substances. However, as it will be readily apparent, in certain cases, chemical, or still other methods of separation may suitably be employed to more particularly adapt the process to specialized applications.

The side reaction products of the present process, will in general, consist of linear polymeric sulfur-containing compounds which may be separated and employed as lubricants, or may be further treated to improve the color, alter the terminal groups of the polymeric materials, and to increase the molecular weight of the polymer, or the like. These side reaction products are commercially valuable because of their extreme pressure characteristics particularly for applications such as hypoid gear lubricants and cutting oils. The preparation and employment of the polymeric substances obtained as side reaction products in the present process is described and claimed in the copending applications of Vaughan and Harman, Serial No. 708,194 filed November 6, 1946, now forfeited, and Harman and Vaughan, Serial No. 701,412, filed October 5, 1946, now Patent 2,522,512.

To illustrate further the preferred procedure to be employed in the preparation of heterocyclic sulfur-containing compounds, the following reactions will be described in detail:

1. Diallylamine with hydrogen sulfide to form 2,6-dimethyl-1,4-thiazane.
2. Dimethallyl ether with hydrogen sulfide to form 3,3,5,5-tetramethyl-1,4-oxathiane.
3. Diallyl ether with hydrogen sulfide to form 3,5-dimethyl-1,4-oxathiane.

By employing the same reaction conditions, i. e., the same proportions of reactants, amount of catalyst, reaction temperature, reaction time and pressure, the following representative conversions are accomplished:

Diallyl sulfide to 2,6-dimethyl-1,4-dithiane
3-butenyl vinyl ether to 2,4-dimethyl-1,3-oxathiane
3-butenyl vinyl amine to 2,6-dimethyl-1,3-thiazane
Bis(vinylmercapto)methane to symmetrical-dimethyltrithiane
1,6-heptadiene to 2,6-dimethylthiane
Allyl vinyl ether to 2,4-dimethyl-1,3-oxathiolane
Diallyl disulfide to 4,6-dimethyl-1,2,5-trithiepane
Vinyl allylamine to 2,5-dimethyl-1,3-thiazolane
Dimethallyl sulfide to 2,2,6,6-tetramethyl-1,4-dithiane
Dichlorallyl ether to 3,5-dichloro-3,5-dimethyl-1,4-oxathiane Similarly, by the employment of the same reaction conditions but in the presence of an organic peroxide, in an amount of from about 1 to about 10 molar percent of the total molar amount of diolefin and hydrogen sulfide reactants, the following representative conversions are accomplished:

Divinyl sulfide to 1,4-dithiane
1,4-pentadiene to thiane
Divinyl ether to 1,4-thioxane
2,3-dimethylpentadiene-1,4 to 3,4-dimethylthiane

*Example I*

Diallyl amine (14.6 grams, 0.15 mole) and hydrogen sulfide (5.1 grams, 0.15 mole) were heated in a Pyrex bomb tube for 30 hours at 100° C. Upon distillation 49 percent of the product boiled between 44 and 62° C., mainly at 60° C., at 0.2–0.5 mm.; $n_D^{20}=1.5088$. Analyses of the colorless liquid indicate that it is 2,6-dimethyl-1,4-thiazane:

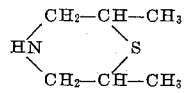

|  | Found | Calculated |
|---|---|---|
| S, Per Cent W | 24.5 | 24.4 |
| SH, as S, Per Cent W | 0.14 | 0.00 |
| Mol. weight (cryo-benzene) | 129 | 131 |
| N, Per Cent W (Dumas) | 10.4 | 10.7 |

*Example II*

Dimethallyl ether (94 grams, 0.75 mole), hydrogen sulfide (30 grams, 0.88 mole) and n-butylamine (3.6 grams, 0.05 mole) were heated together in a stainless steel bomb for 23 hours at 110° C. The product upon distillation yielded 22 percent of a colorless liquid: B. P.=130–132° C. at 19 cm. pressure, $n_D^{20}=1.4748$. This liquid analyzed as 3,3,5,5-tetramethyl-1,4-oxathiane:

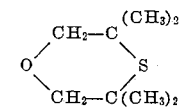

|  | Found | Calculated |
|---|---|---|
| S, Per Cent W | 19.7 | 20.2 |
| SH, as S, Per Cent W | 0.29 | 0.00 |
| Mol. weight (cryo-benzene) | 150 | 158 |

Example III

Diallyl ether (73.6 grams, 0.75 mole), hydrogen sulfide (30 grams, 0.88 mole) and di-n-butylamine (10 grams, 0.078 mole) were heated together at 100° C. for 89 hours in a 200 cc., 18-8 stainless steel bomb. By distillation the product was shown to contain 43 percent by weight of a water-white liquid boiling at 113–114° C. at 16 cm. pressure: $n_D^{20}=1.4850$. Analyses indicate that this liquid is 2,6-dimethyl-1,4-thioxane:

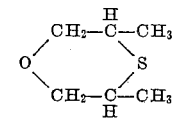

|  | Found | Calculated |
|---|---|---|
| S, Per Cent W | 23.5, 23.6 | 23.3 |
| SH, or S, Per Cent W | 0.01 | 0.00 |
| Mol. weight (cryo-benzene) | 147 | 132 |
| Mol. weight (cryo-dioxane) | 120 |  |

As many changes could be made in carrying out the above processes without departing from the scope of the invention, it is intended that all matter contained in the above description shall be interpreted as illustrative and not in a limiting sense.

We claim as our invention:

1. A process for the production of a heterocyclic compound which comprises heating hydrogen sulfide with an olefinically unsaturated heteroatomic compound of the class consisting of bis(alkenyl) ethers, bis(alkenyl) sulfides, and bis(alkenyl) secondary amines, in which heteroatomic compound the olefinic carbon atoms nearer in each alkenyl group to the heteroatom are separated from each other by not less than two and not more than three directly intervening atoms including the heteroatom, in the presence of an alkaline ionic catalyst at a temperature at which reaction occurs but below the decomposition temperature of the olefinically unsaturated heteroatomic reactant.

2. A process for the production of a heterocyclic compound which comprises heating hydrogen sulfide with a bis(alkenyl) secondary amine wherein the olefinic carbon atoms nearer in each alkenyl group to the amino nitrogen atom are separated from each other by not less than two and not more than three directly intervening atoms including the amino nitrogen atom at a temperature at which reaction occurs but below the decomposition temperature of the bis(alkenyl) secondary amine.

3. A method of preparing 2,6-dimethyl-1,4-thiazane, which comprises, heating a mixture of diallylamine and hydrogen sulfide to a temperature of from 90° C. to 120° C. under superatmospheric pressure.

4. A method of preparing 3,3,5,5-tetramethyl-1,4-oxathiane, which comprises, heating to a temperature of from 90° C. to 120° C., a mixture of dimethallyl ether and hydrogen sulfide, containing butylamine in an amount of from 2 to 5 molar per cent of the mixture.

5. A method of converting a di-2-alkenylamine to a 1,4-thiazane, which comprises, heating under superatmospheric pressure to a temperature at which reaction occurs but below the decomposition temperature of the amine, a mixture of said amine with hydrogen sulfide.

6. A method of converting a di-2-alkenyl ether to a 1,4-oxathiane, which comprises, heating under superatmospheric pressure to a temperature at which reaction occurs but below the decomposition temperature of the ether, such an ether mixed with hydrogen sulfide and with a catalytic amount of a saturated alkyl amine.

7. A method of converting di-2-alkenyl sulfides to 1,4-dithianes, which comprises, heating under superatmospheric pressure to a temperature at which reaction occurs but below the decomposition temperature of the sulfide, such a sulfide mixed with hydrogen sulfide and a catalytic amount of a saturated alkyl amine.

DENHAM HARMAN.
WILLIAM E. VAUGHAN.

REFERENCES CITED

The following references are of record in the file of this patent:

UNITED STATES PATENTS

| Number | Name | Date |
|---|---|---|
| 2,061,018 | Carothers | Nov. 17, 1936 |
| 2,061,019 | Carter et al. | Nov. 17, 1936 |
| 2,273,664 | Searle | Feb. 17, 1942 |
| 2,352,435 | Hoeffelman et al. | June 24, 1944 |

FOREIGN PATENTS

| Number | Country | Date |
|---|---|---|
| 558,790 | Great Britain | Jan. 21, 1944 |

OTHER REFERENCES

Schneider, Ber. 70B, 429 (1937).